W. S. BROWN.
POSITIONING MECHANISM.
APPLICATION FILED SEPT. 26, 1914.
1,143,034.
Patented June 15, 1915.
3 SHEETS—SHEET 1.
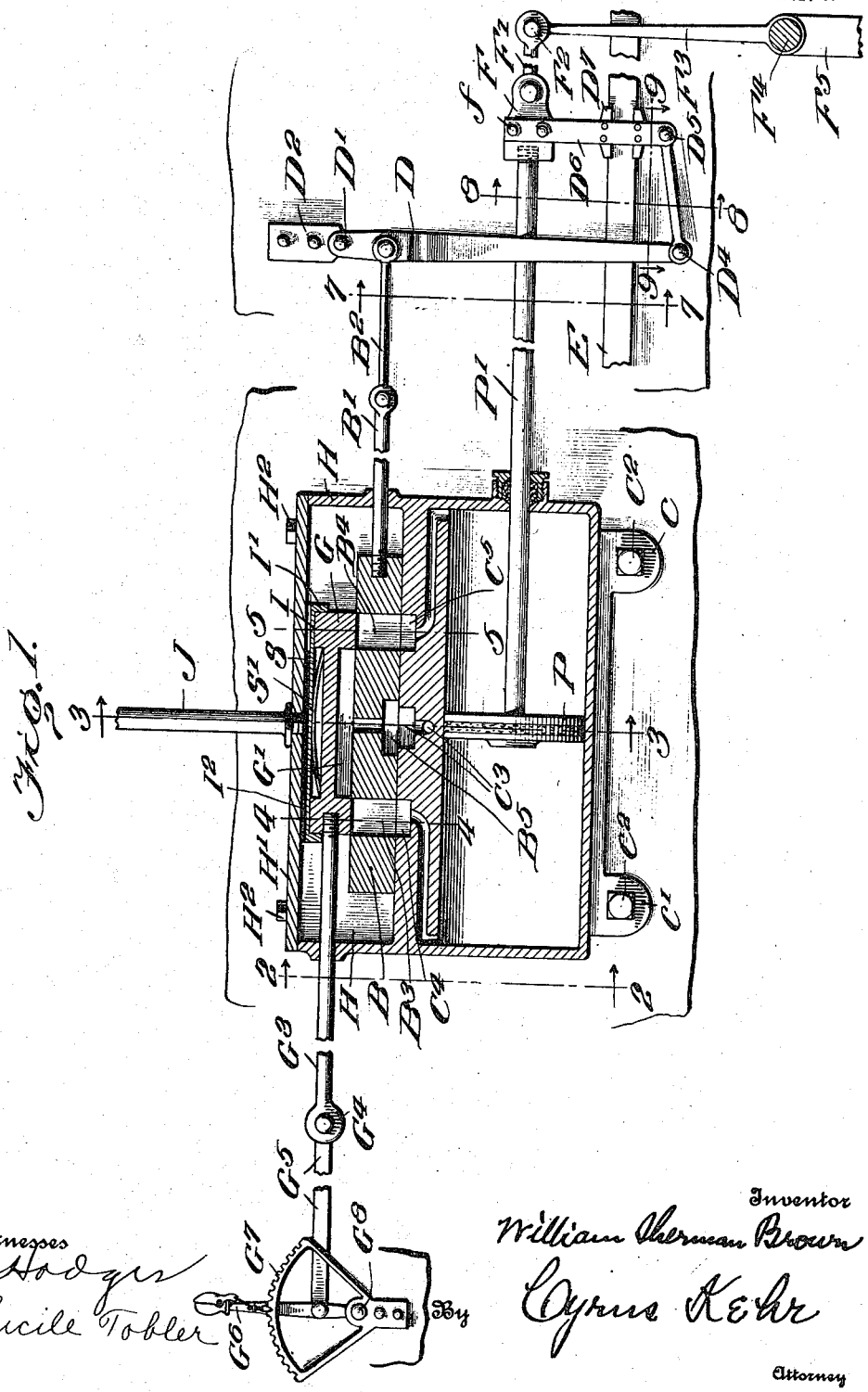

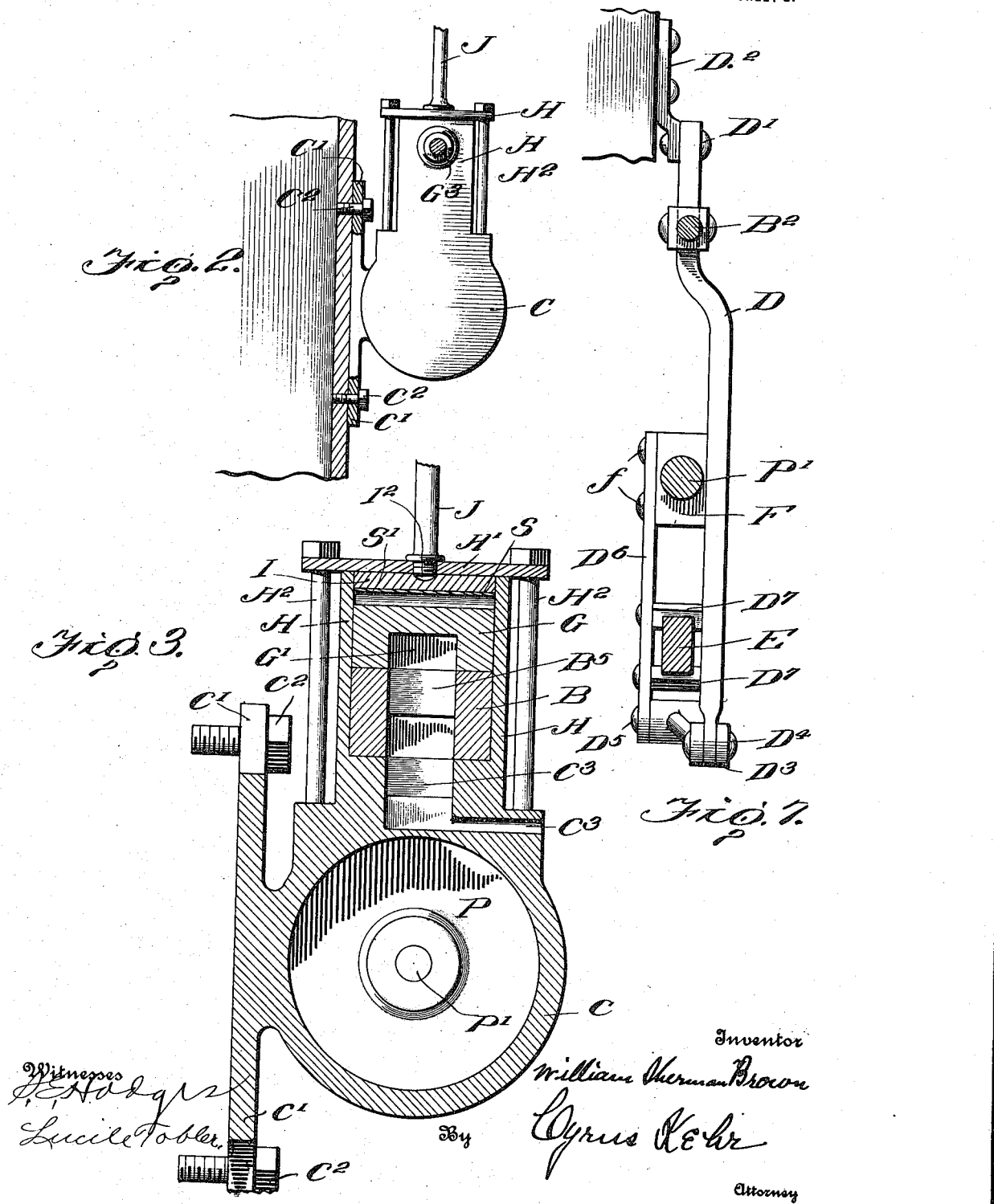

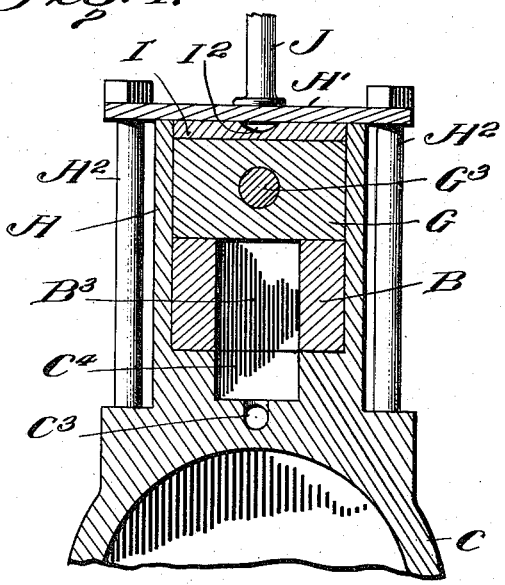
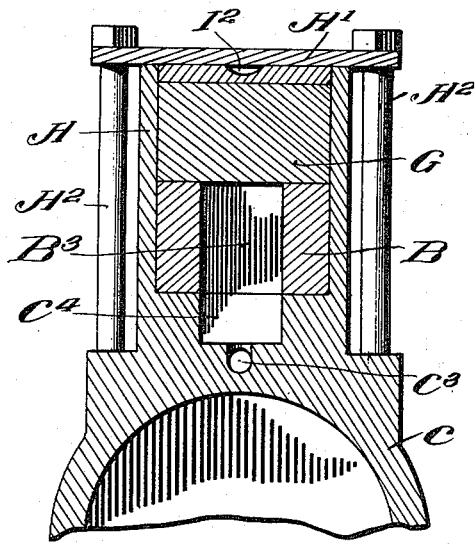
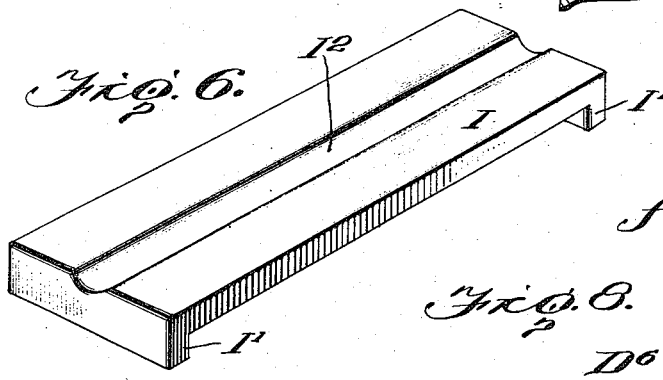
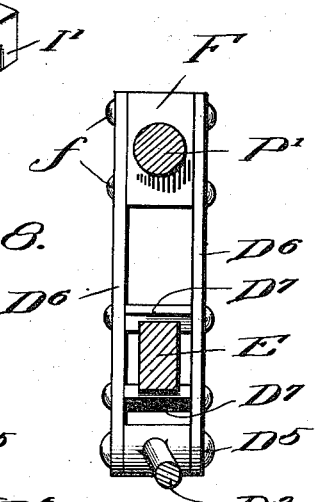
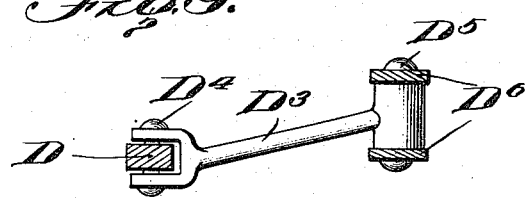

UNITED STATES PATENT OFFICE.

WILLIAM SHERMAN BROWN, OF KNOXVILLE, TENNESSEE.

POSITIONING MECHANISM.

1,143,034.  Specification of Letters Patent.  Patented June 15, 1915.

Application filed September 26, 1914. Serial No. 863,743.

*To all whom it may concern:*

Be it known that I, WILLIAM SHERMAN BROWN, a citizen of the United States, residing at Knoxville, in the county of Knox and State of Tennessee, have invented a new and useful Improvement in Positioning Mechanism, of which the following is a specification, reference being had to the accompanying drawing.

My improvement relates particularly to mechanism for at the will of the operator placing or positioning a mechanical member into any chosen position within the range of the movement of said member and there holding said member until it is desired to bring it into another chosen position within said range of movement.

The object of the improvement is to provide such a mechanism which can be operated by the application of relatively small power by the operator and which is capable of exerting a relatively large force upon the mechanical member which is to be positioned.

A further object is to produce such a mechanism adapted to position a member located at a considerable distance from the operator.

A fluid under pressure, such as steam, air, or water is used to exert force through the mechanism.

My improvement is illustrated herein as applied to a reverse lever of a steam engine; but it is understood that the mechanism is applicable also for the positioning of other parts of a steam engine or parts of other machinery or apparatus.

In the accompanying drawings, Figure 1 is a side elevation of a mechanism embodying my improvement, a portion being in longitudinal upright section; Fig. 2 is a section on the line, 2—2, of Fig. 1, looking toward the right; Fig. 3 is a section on the line, 3—3, of Fig. 1, looking toward the right; Fig. 4 is a section on the line, 4—4, of Fig. 1, looking toward the right; Fig. 5 is a section on the line, 5—5, of Fig. 1, looking toward the right; Fig. 6 is a perspective view of a saddle plate; Fig. 7 is a section on the line, 7—7, of Fig. 1, looking toward the right; Fig. 8 is a section on the line, 8—8, of Fig. 1, looking toward the right; Fig. 9 is a horizontal section on the line, 9—9, of Fig. 1.

Referring to said drawings, $F^3$, is a reverse arm rigid on and rising from a horizontal rock shaft, $F^4$, resting in a bearing, $F^5$. Said arm is the reverse arm of the reversing mechanism of a steam locomotive or of any steam engine having a reversing mechanism. The work or function of my mechanism is the placing and holding of said arm in various chosen positions within its range of movement.

$G^6$, is a quadrant lever hinged by its lower end at $G^8$, to a relatively fixed portion of the locomotive and adapted to engage the quadrant, $G^7$, in different positions when said quadrant lever is by the operator changed from one position to another. Said lever may be any other form of hand lever.

Through a connection with the quadrant lever a portion of my positioning mechanism is so adjusted as to permit the actuating fluid to so move other portions of the mechanism as to cause the reverse arm to change from one position to another corresponding to the change made by the quadrant lever. In such case, the arm of the operator exerts force upon the quadrant lever and through the latter upon a relatively easily-movable member of my improved apparatus, and force is exerted upon the reverse lever by the pressure fluid and not by the arm of the operator, and the force exerted upon the reverse lever may be relatively large.

A cylinder, C, is secured immovably to any relatively stationary portion of the locomotive, as, for example, the boiler. The cylinder has at one side and integral therewith upright portions, $C^1$, adapted to bear against the boiler or other portion of the locomotive and be secured thereto by means of bolts, $C^2$.

The upper portion of the cylinder rises above the cylinder chamber and is made level to form a seat for a valve chest and a sliding valve member.

In the middle of such upper portion of the cylinder is an exhaust port, $C^3$, and rearward of said port, is an outer port, $C^4$, leading into the cylinder chamber at the rear end of the latter.

Forward of the middle port, $C^8$, the cylinder has an outer part, $C^5$, leading into the cylinder chamber at the forward end of the latter.

On the flat upper face of the cylinder rests the valve chest comprising the upright part, H, and the top plate, $H^1$.

Bolts, $H^2$, extend downward through the projecting edges of the top plate and are screw-threaded into the upper portion of the cylinder. An inlet pipe, J, is applied to the top plate at the middle of the latter to transmit fluid under pressure through said plate into the space inclosed by said chest.

Within the chest, an inner valve member, B, rests flatwise upon the flat upper face of the cylinder and is wide enough to fill the space between the side walls of the chest, but short enough to permit endwise sliding within the chest and upon the cylinder. Upon this valve member rests an outer valve member, G, shorter than the valve member, B, but wide enough to fill the space between the side walls of the chest.

On the valve member, G, is a saddle plate, I, having at each end a downward extension, $I^1$, extending over the upper portion of the adjacent end of the valve member, G. Said saddle plate is shown as wide as the space between the side walls of the chest. In the upper portion of the member, G, is a cavity, S, in which rests a spring, $S^1$, bearing upward against the saddle plate, whereby the latter is pressed upward against the top plate, $H^1$, of the chest, and the valve member, G, is pressed downward upon the valve member, B, whereby the latter is pressed upon the flat upper face of the cylinder.

A channel, $I^2$, is formed in the upper face of the saddle plate along the middle longitudinal line of said plate. The inlet pipe, J, opens into said channel, so that the pressure fluid may pass from said pipe through said channel into both ends of the valve chest.

A valve stem, $G^3$, extends slidably through the rear wall of the chest and has its forward end joined to the outer valve member, G. The opposite or rear end of said stem is coupled at $G^4$ to a link, $G^5$, which is also coupled to the quadrant lever between the ends of the latter. By shifting the quadrant lever forward or backward into various positions, the valve member, G, is moved in the same direction and through distances corresponding approximately to the distances through which the portion of the lever connected with the link, $G^5$, is moved. If the quadrant lever is locked on the quadrant, the valve member, G, is held immovably. The downward extensions, 1, of the saddle plate engage the ends of the valve member, G, so that said plate travels with the member, G. A stem, $B^1$, extends horizontally through the forward end wall of the chest and is secured to the forward end of the inner valve member, B. The forward end of said stem is coupled to one end of the horizontal link, $B^2$. The forward end of said link is coupled to the upright, oscillating lever, D, the upper end of which is coupled at $D^1$ to the lower end of the bracket, $D^2$, which is secured immovably to the boiler or any other portion of the locomotive (not shown). To give the lever, D, sufficient length, it is extended across the piston stem, $P^1$, and the beam, E. The point at which the link, $B^2$, is coupled to the lever, D, is near the point, $D^1$, in order to give said lever a short arm and a long arm, the short arm acting on the link, $B^2$, and imparting thereto a movement which is short relative to the movement of the free end of the lever, so that a relatively long movement of the piston stem, $P^1$, will produce a short movement of the link, $B^2$, the valve stem, $B^1$, and the inner valve, B, as hereinafter described.

Within the cylinder is the piston head, P, and a piston stem, $P^1$, extends horizontally through the forward end of the cylinder and has its rear end secured to the piston head. A block, F, is rigidly secured to the forward end of the piston stem. A relatively stationary guide beam, E, is located below and parallel to the piston stem.

For the purpose of forming a connection between the piston stem and the free or swinging end of the lever, D, a lateral extension is applied to the block, F, and extended downward below the beam, E. For forming said extension an upright bar, $D^6$, is placed at each side of the block, F, and secured thereto by means of bolts, $f$, and extended below the beam, E.

Saddle blocks, $D^7$, are applied to the upper and lower edges of the beam, E, between the bars, $D^6$. Bolts, $d$, extend through said bars and saddle blocks and bind said members together. Said saddle blocks are slidable on the beam, and said blocks and said bars, $D^6$, constitute a support and guide for the block, F, and the piston stem, $P^1$, and serve to compel the block, F, and the forward end of the piston stem to travel parallel to said beam.

A horizontal link, $D^3$, has its forward end extending between the lower ends of the bars, $D^6$, and is coupled thereto by a horizontal pin, $D^5$. The rear end of said link, $D^3$, is forked and extends to each side of the lower end of the oscillating link, D, and is coupled thereto by a horizontal pin, $D^4$.

At the middle of the inner valve member, B, is a middle exhaust port, $B^5$, which extends through said member and stands above the cylinder port, $C^3$, when the member, B, is in its middle position.

Rearward of the port, $B^5$, the valve, B, has an outer port, $B^3$, which stands above the outer cylinder port, $C^4$, when the valve, B, is in its middle position.

Forward of the port, $B^5$, the valve, B, has another outer port, $B^4$, which stands above the outer cylinder port, $C^5$, when said valve is in its middle position.

The length of the valve, G, is just sufficient to cover the ports, $B^3$ and $B^4$, of the valve, B, when the valve, G, rests with its middle above the middle of the valve, B.

In the lower face of the valve, G, is a chamber or exhaust port, G¹, which is so located and of such length as to at all times communicate with the exhaust port, B⁵, of the valve, B. And said chamber or exhaust port, G¹, is of such length horizontally as to leave a solid portion between said port and the end of the valve, G, sufficient, and only sufficient, to cover the adjacent port, B³, or B⁴, in the valve, B, so that when the valve, G, is in its middle position upon the valve, B, the ports, B³ and B⁴, are closed with the least possible lap. Under this arrangement, a slight endwise movement of the valve, G, in either direction will correspondingly open the ports, B³ and B⁴, one for taking the pressure fluid into the cylinder and the other for exhausting the pressure fluid from the cylinder, the exhaust ports, G¹, B⁵, and C³, being at all times in communication for the exhausting of fluid.

Assuming that the reverse lever and the quadrant are in their middle positions and that the valve members, B and G, are in their middle positions, as shown in Fig. 1, so that the ports, B³ and B⁴, are closed by the outer valve, G, and that it is desired to turn the reverse lever, F³, forward, then the quadrant lever, G⁶, is moved forward so as move the link, G⁵, forward as far as it is desired to move the upper end of the reverse lever, and the quadrant lever is then secured in its new position on the quadrant. Such movement of the link, G⁵, correspondingly moves the stem, G³, and the outer valve, G, forward, whereby the port, B³, of the valve, B, is open to the valve chest and the port, B⁴, is open to the exhaust port, G¹. Thus pressure fluid is admitted into the portion of the cylinder at the rear of the piston head, P, and the latter and the piston stem, P¹, the block, F, and the link, F¹, and the upper end of the reverse lever, F², are driven forward. Such forward movement of the block, F, carries the bars, D⁶, and the link, D³, and the lower end of the oscillating link, D, forward as far as the piston head is moved. Such movement of the link, D, draws the link, B², the stem, B¹, and the valve, B, forward through a distance which is shorter than the distance through which the piston head travels. By such forward movement of the valve, B, the ports, B³ and B⁴, move forward beneath the valve, G, until said ports are covered and closed by the valve, G. This cuts off both supply and exhaust of the pressure fluid, and the piston head is stopped and held. Reverse action takes place when the quadrant lever is mover rearward. Whenever the piston head is stopped, the piston stem, P¹, the block, F, the link, F¹, and the reverse arm, F³, are also stopped and held.

The inner valve and the outer valve are connected independently of each other, the former being moved only through the quadrant lever and the latter through the piston stem.

It is to be observed that if through leakage around the piston head or from any other cause there is accidental or abnormal movement of the piston head, the piston stem, P¹, the block, F, and the link, F¹, the valve, B, will be moved in the same direction and will open the ports, B³ and B⁴, to admit pressure fluid to the proper side of the piston head to return the latter to its proper position. Thus the position of the outer valve always determines the position of the piston head.

It is to be observed, also, that this mechanism is organized and arranged for precise movement and durability of the parts. The valves, B and G, are adapted to accurate travel, and the connections between the valve, G, and the quadrant lever and between the valve, B, and the block, F, are adapted to produce a minimum of lost motion and abnormal movement.

I claim as my invention,

1. In a mechanism of the nature described, a cylinder having a middle exhaust port and two outer ports, a piston head in said cylinder, a piston stem connected with said head and extending through one end of the cylinder, a member to be positioned, said member being in operative relation with said piston stem, a valve chest on said cylinder, two valve members within said chest and having ports and being slidable endwise independently of each other, a stem on each valve member independent of the other, a hand lever operatively connected with one of said stems, and means connected with the piston and with the other valve stem for imparting a relatively slow movement from the piston stem to said valve stem, substantially as described.

2. In a mechanism of the nature described, a cylinder having a middle exhaust port and two outer ports, a piston head in said cylinder, a piston stem connected with said head and extending through one end of the cylinder, a member to be positioned, said member being in operative relation with said piston stem, a valve chest on said cylinder, two valve members within said chest and having ports and being slidable endwise independently of each other, a stem on each valve member independent of and extending in the direction opposite the direction of the other, a hand lever operatively connected with one of said stems, and means connected with the piston stem and with the other valve stem for imparting a relatively slow movement from the piston stem to said valve stem, substantially as described.

3. In a mechanism of the nature described, a cylinder having a middle exhaust port and two outer ports, a piston head on said cylinder, a piston stem connected with said head and extending through one end of the cylinder, a member to be positioned, said member being in operative relation with said piston stem, a valve chest on said cylinder, a saddle plate within said chest, two valve members within said chest and having ports and being slidable endwise independently of each other, a stem on each valve member independent of the other, a hand lever operatively connected with one of said stems, and means connected with the piston stem and with the other valve stem for imparting a relatively slow movement from the piston stem to said valve stem, substantially as described.

4. In a mechanism of the nature described, a cylinder having a middle exhaust port and two outer ports, a piston head in said cylinder, a piston stem connected with said head and extending through one end of the cylinder, a member to be positioned, said member being in operative relation with said piston stem, a valve chest on said cylinder, a channeled saddle plate within said chest, two valve members within said chest and having ports and being slidable endwise independently of each other, a stem on each valve member independent of the other, a hand lever operatively connected with one of said stems, and means connected with the piston stem and with the other valve stem for imparting a relatively slow movement from the piston stem to said valve stem, substantially as described.

5. In a mechanism of the nature described, a cylinder having a middle exhaust port and two outer ports, a piston head in said cylinder, a piston stem connected with said head and extending through one end of the cylinder, a member to be positioned, said member being in operative relation with said piston stem, a valve chest on said cylinder, a saddle plate and a spring within said chest, two valve members within said chest and having ports and being slidable endwise independently of each other, a stem on each valve member independent of the other, a hand lever operatively connected with one of said stems, and means connected with the piston stem and with the other valve stem for imparting a relatively slow movement from the piston stem to said valve stem, substantially as described.

6. In a mechanism of the nature described, a cylinder having a middle exhaust port and two outer ports, a piston head in said cylinder, a piston stem connected with said head and extending through one end of the cylinder, a member extending laterally on the piston stem, a member to be positioned, said member being in operative relation with said piston stem, a valve chest on said cylinder, two valve members within said chest and having ports and being slidable endwise independently of each other, a stem on each valve member independent of the other, a hand lever operatively connected with one of said stems, and means connected with the member extending laterally on the piston stem and with the other valve stem for imparting a relatively slow movement from the piston stem to said valve stem, substantially as described.

In testimony whereof I have signed my name, in presence of two witnesses, this third day of September, in the year one thousand nine hundred and fourteen.

WILLIAM SHERMAN BROWN.

Witnesses:
  CYRUS KEHR,
  S. E. HODGES.